(12) United States Patent
Okuda

(10) Patent No.: US 7,845,836 B2
(45) Date of Patent: Dec. 7, 2010

(54) DECORATIVE PART

(75) Inventor: Yuuichiro Okuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 496 days.

(21) Appl. No.: 11/980,780

(22) Filed: Oct. 31, 2007

(65) Prior Publication Data

US 2008/0143132 A1 Jun. 19, 2008

(30) Foreign Application Priority Data

Dec. 19, 2006 (JP) ............... 2006-341078

(51) Int. Cl.
*F21V 33/00* (2006.01)
(52) U.S. Cl. ...................... 362/488; 362/501
(58) Field of Classification Search ............... 362/488, 362/487, 501
See application file for complete search history.

(56) References Cited

U.S. PATENT DOCUMENTS

| | | | |
|---|---|---|---|
| 6,000,822 A * | 12/1999 | Polizzi et al. ............... | 362/488 |
| 6,160,475 A * | 12/2000 | Hornung et al. ............. | 340/461 |
| 7,237,933 B2 * | 7/2007 | Radu et al. .................. | 362/488 |
| 2005/0255306 A1 | 11/2005 | Wolff et al. | |
| 2006/0067083 A1 * | 3/2006 | Bogdan et al. ............... | 362/488 |
| 2007/0036946 A1 * | 2/2007 | Muller et al. ............... | 428/157 |

FOREIGN PATENT DOCUMENTS

| JP | 07-179614 A | 7/1995 |
|---|---|---|
| JP | 08-058376 A | 3/1996 |
| JP | 11-105200 A | 4/1999 |
| JP | 2002-097339 A | 4/2002 |
| JP | 2005-052181 A | 3/2005 |

OTHER PUBLICATIONS

Automotive Engineering Handbook vol. 3, designing (desgin-body), Incorporated Association Society of Automotive Engineers of Japan, published in Mar. 25, 2006 p. 98, col. 2, p. 99, col. 2.

* cited by examiner

*Primary Examiner*—Laura Tso
(74) *Attorney, Agent, or Firm*—Arent Fox LLP

(57) ABSTRACT

There is provided a decorative part for decorating a vehicle interior, including a base; a cushion; and a skin with elasticity having a portion thereof being fixed to the base, the skin being adhered to the cushion and covering the cushion, the cushion being made of a gel elastomer having JIS A hardness of 5 or less or Asker C hardness of 20 or less.

11 Claims, 5 Drawing Sheets

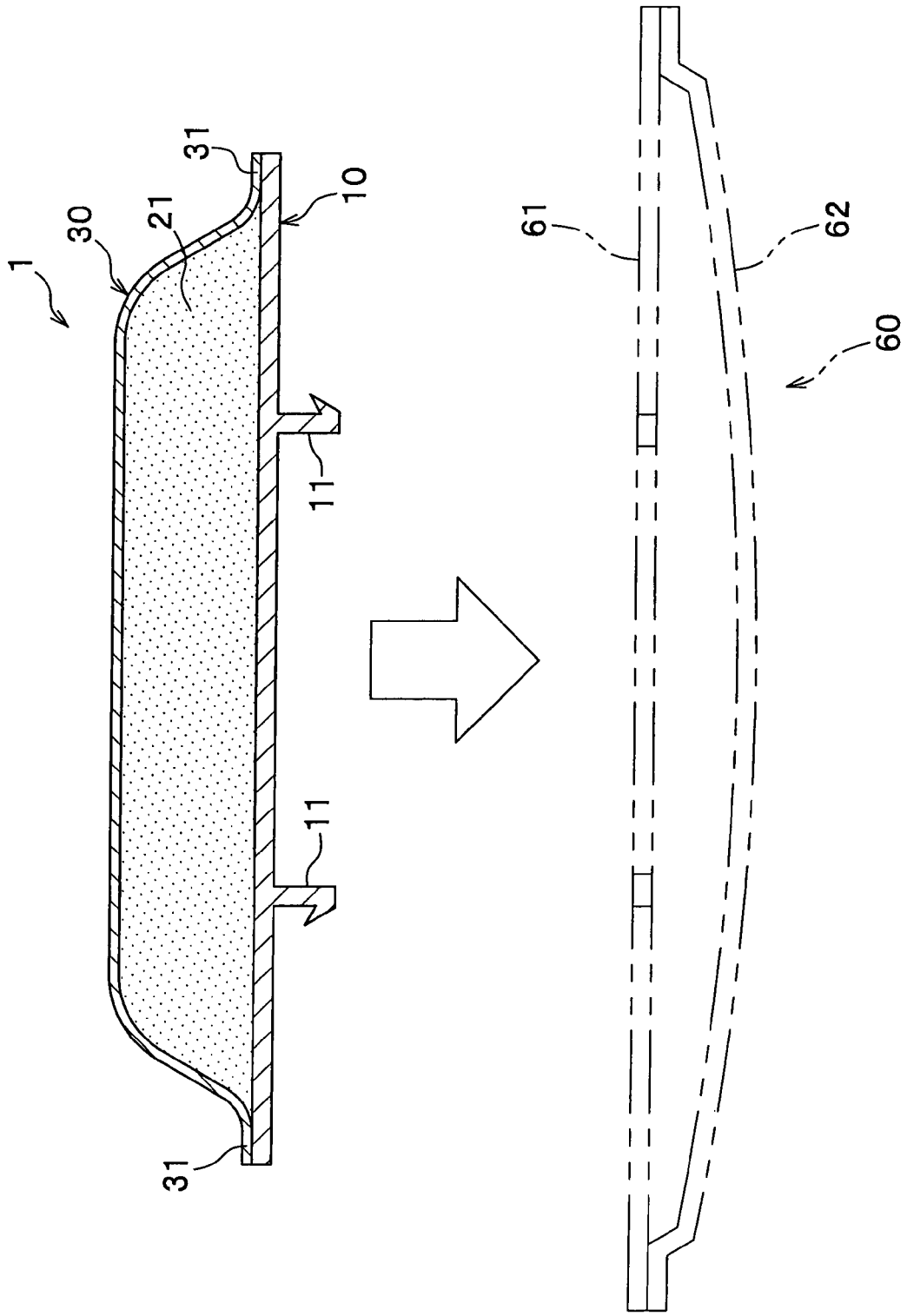

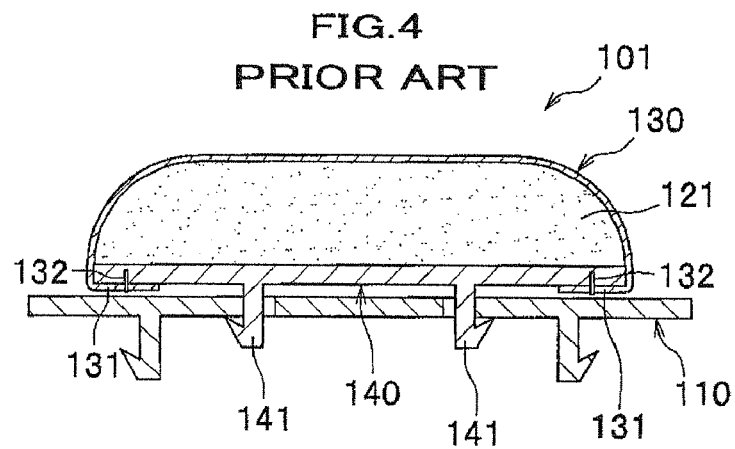
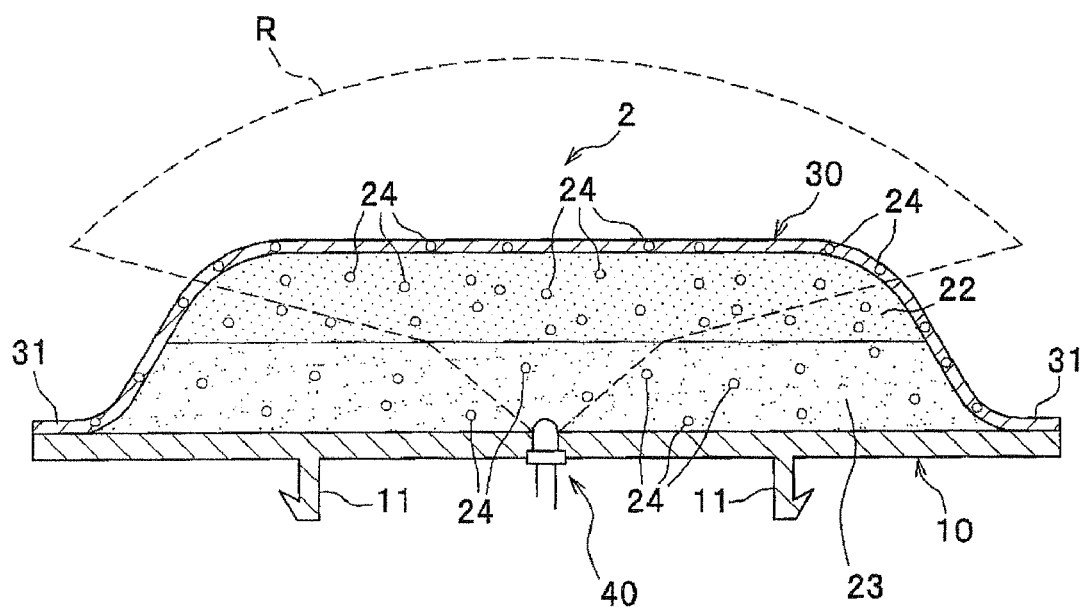

DECORATIVE PART

CROSS-REFERENCE TO RELATED APPLICATIONS

This application claims the foreign priority benefit under Title 35, United States Code, section 119 (a)-(d), of Japanese Patent Application No. 2006-341078, filed on Dec. 19, 2006 in the Japan Patent Office, the disclosure of which is herein incorporated by reference in its entirety.

BACKGROUND OF THE INVENTION

1. Field of the Invention

The present invention relates to a decorative part for decorating a vehicle interior face.

2. Description of the Related Art

In a field of automobile, which is a representative example of vehicle, techniques for improving a tactual feel of interior materials have been proposed, in order to add quality to a vehicle interior. For example, a proposal has been made in which cushions made of an urethane foamable resin are embedded in decorative parts which a driver or the like holds or touches, such as door trim (arm rest) (see Japanese patent No. 3341559 or corresponding U.S. Pat. No. 5,951,094, and Automotive Engineering Handbook Vol. 3, designing (design-body), Incorporated Association Society of Automotive Engineers of Japan, published in Mar. 25, 2006, p. 98-99).

However, the door trims disclosed in the above-mentioned documents do not have sufficient elasticity, and there is a room for further improvement in the tactual feel. Therefore, it would be desirable to provide a decorative part with the enhanced tactual feel, which gives a softer feeling to the driver or the like.

SUMMARY OF THE INVENTION

In one aspect of the present invention, there is provided a decorative part for decorating a vehicle interior, including a base; a cushion; and a skin with elasticity having a portion thereof being fixed to the base, the skin being adhered to the cushion and covering the cushion, the cushion being made of a gel elastomer having JIS A hardness of 5 or less or Asker C hardness of 20 or less.

Herein, the expression "decorative part for decorating vehicle interior" means a component forming a portion of an interior face of a vehicle, which covers inner side faces of doors, a surface of an instrument panel, surfaces of consoles, a surface of an arm rest or the like, to decorate the vehicle interior.

According to the decorative part, the cushion is made of a gel elastomer having JIS A hardness of 5 or less, or Asker C hardness of 20 or less. Therefore, when the driver and the like grasps or pushes the decorative part, the cushion easily deforms in accordance with the grip force or pressure applied by the driver and the like. Accordingly, with this decorative part, the tactual feel of the vehicle interior face is enhanced, adding quality to the vehicle interior.

Since the cushion is enclosed and is not exposed, the driver and the like never come into contact with the cushion made of a gel elastomer generally having tackiness.

Since the skin is adhered to the cushion and has elasticity, the skin can deform in a unified manner with the cushion, while being brought into close contact with the cushion.

It may be preferable that the gel elastomer is any one of an olefin gel elastomer and a styrene gel elastomer, and the base is made of an olefin elastomer.

According to this decorative part, the cushion made of the olefin gel elastomer or the styrene gel elastomer and the base made of the olefin elastomer (e.g., polypropylene) can be easily welded to each other, and adhesiveness between the cushion and the base can be enhanced.

It may be preferable that the skin and the cushion have light transmission property.

According to this decorative part, the skin and the cushion have light transmission property, and therefore, an inside of the cushion is visible from the exterior. Accordingly, for example, the cushion may be made of two or more gel elastomers with different optical reflectivities, and an emblem may be shaped with a gel elastomer, or a gradation tone may be applied to a gel elastomer, to thereby enhance design of the decorative part.

The skin and the cushion may be either transparent or semi-transparent, as long as they have light transmission property. However, it is preferred that the skin provided on an inner side of the vehicle is made transparent, and the cushion is made transparent or semi-transparent.

It may be preferable that the decorative part further includes a light source for illuminating the cushion and the skin.

According to this decorative part, by introducing the light source, the cushion and the skin can be illuminated. Therefore, for example, even during night time, the inside of the cushion is visible. In addition, with the cushion and the skin which is made brighter by illumination of the light source, the vehicle interior can be illuminated. Moreover, by decorating a shift lever knob, a cup holder and the like with this decorative part, positions of the shift lever knob and the like can be easily and visibly checked due to the brighter decorative part, which enhances ease of operation and the like.

In order to enhance the design of the decorative part, it is desired that the light source be positioned on a back side of the decorative part (opposite side to the vehicle interior side).

It may be preferable that the decorative part further includes color particles dispersed in at least one of the cushion and the skin.

According to this decorative part, when the color particles are small, i.e., the color particle is pigment itself, at least one of the cushion and the skin can be colored with the color particles (pigments) dispersed in at least one of the cushion and the skin.

When the color particles are large, i.e., have a certain size and dispersed in at least one of the cushion and the skin, a dot pattern can be easily added to at least one of the cushion and the skin.

It should be noted that the color particles may be dispersed in an entire body or a portion of at least one of the cushion and the skin.

It may be preferable that the decorative part further includes scatterers for scattering light dispersed in at least one of the cushion and the skin.

According to this decorative part, by the scatterers dispersed in at least one of the cushion and the skin, light from the light source can be scattered, and an entire body of at least one of the cushion and the skin can be made brighter.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIG. 2 is a cross sectional view of a door trim according to the present invention.

FIG. 3 shows production steps of a door trim according to the present invention, in which.

FIG. 4 is a cross sectional view of a conventional door trim.

FIG. 5 is a cross sectional view of a door trim according to a modified embodiment.

FIG. 6 shows a steering wheel emblem part according to a modified embodiment, in which.

DETAILED DESCRIPTION OF THE EXEMPLARY EMBODIMENTS

Embodiments of the present invention will be described in detail below with reference to the accompanying drawings.

Figure 1:
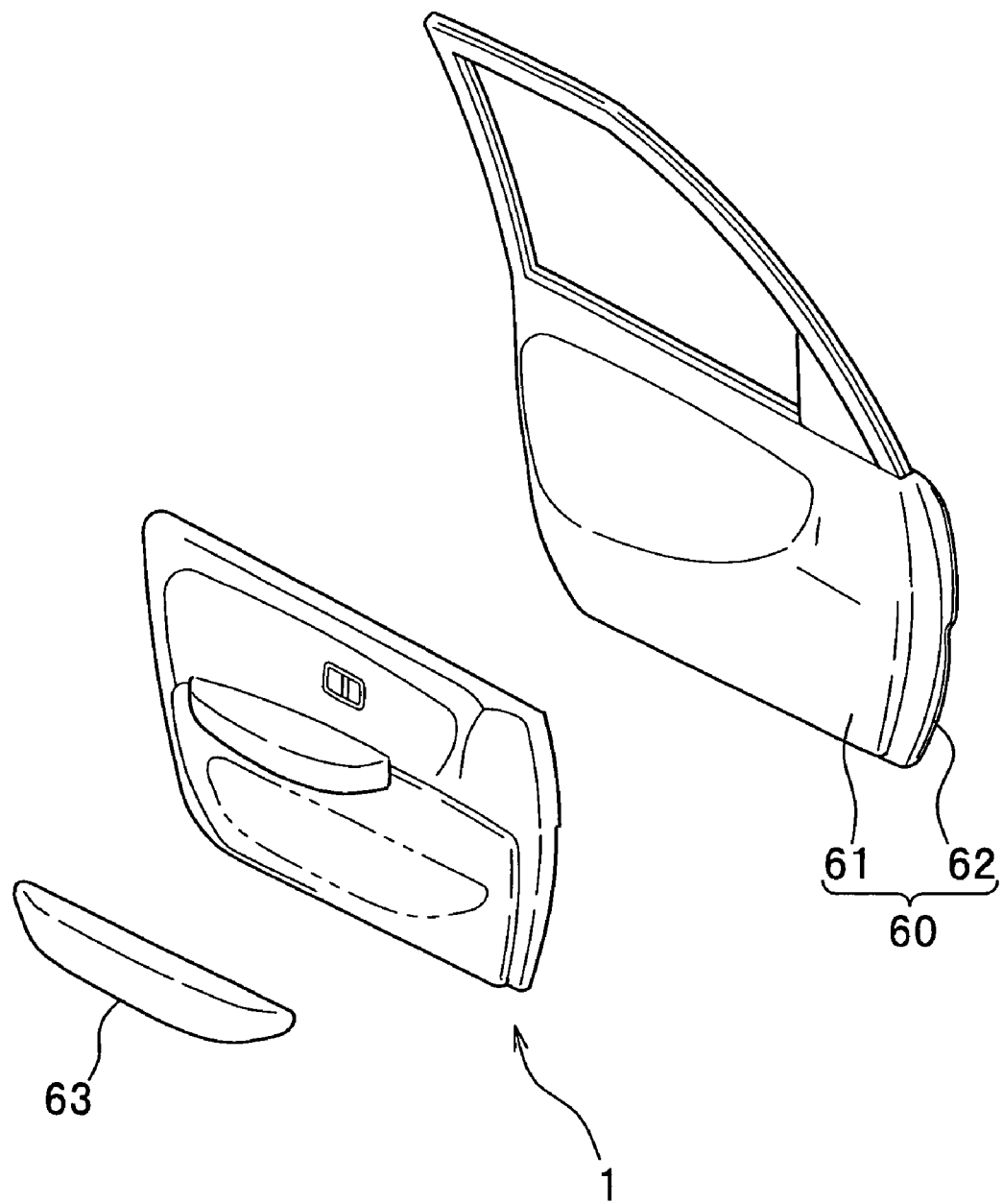
FIG. 1 is a perspective view of a door trim according to the present invention.

In the following descriptions, the present invention is exemplified with an automobile. Also in the following descriptions, a driver, passengers, and other users of the vehicle may be collectively referred to as "driver". In FIGS. 2 and 3, a door trim shown in FIG. 1 is schematically presented. In the present embodiment, a door trim is used for explaining a decorative part, but the decorative part is not limited to the door trim.

<<Configuration of Door Trim>>

As shown in FIG. 1, a door trim 1 (decorative part) according to the present embodiment is a part for decorating the vehicle interior face, which is attached to an inner panel 61 of a door 60 by clips 11,11 (see FIG. 2). The door 60 includes the inner panel 61 and an outer panel 62, joined as an integral body. After the door trim 1 is attached to the inner panel 61, a door pocket 63 or the like may be attached to the door trim 1.

As shown in FIG. 2, the door trim 1 is composed mainly of a base 10 (base material), a cushion 21 and a skin 30. An edge portion 31 of the skin 30 is welded (fixed) to the base 10, and the cushion 21 is enclosed by the skin 30 and the base 10. The cushion 21 is excellently adhered to (or comes into close contact with; hereinafter, this state may be collectively referred to as "adhered to") the base 10 and the skin 30.

<Base>

The base 10 serves as a base substrate for the door trim 1, and on a back side of the base 10 (a face on a door 60 side), the clips 11, 11 (engagement claws) for engaging the door trim 1 with the inner panel 61 are provided.

The base 10 is made of a material which excellently adheres to the gel elastomer forming the cushion 21 (such as a polypropylene elastomer (a thermoplastic resin)). For example, when the cushion 21 is made of an olefin or styrene gel elastomer, it is preferable that the base 10 be made of an olefin elastomer.

<Cushion>

For the purpose of enhancing the tactual feel of the driver to the door trim 1, i.e., pliancy of the door trim 1, a stress absorber is used for the cushion 21 (pad), which easily deforms and absorbs a grip force, pressure or the like by the driver when he/she touches, grasps or pushes the door trim 1, and occupies a large portion of the door trim 1 in terms of volume. The cushion 21 is made of a gel elastomer, such as an olefin gel elastomer and a styrene gel elastomer, having JIS A hardness of 5 or less, or Asker C hardness of 20 or less.

In short, the cushion 21 made of a gel elastomer elastically deforms more than the conventional cushion made of an urethane foamable resin, and therefore, even though a load on the cushion 21 is small, the cushion deforms more. Accordingly, the tactual feel of the door trim 1 is enhanced, adding quality to the vehicle interior.

With respect to a thickness of the cushion 21 and that of the door trim 1, any value can be used, as log as the door trim 1 gives a soft feeling to the driver who touches the door trim 1. Examples include approximately 5 mm-20 mm. In addition, in order to make the cushion 21 bulky, the cushion 21 may be foamed.

<Skin>

The skin 30, which is a surface material forming a face of the door trim 1 on a vehicle interior side, is made of a material which excellently adheres to the gel elastomer forming the cushion 21 (such as an elastomer (a thermoplastic resin)), and thus adheres to the cushion 21. The skin 30 has elasticity (stretching property) so as to easily follow the deformation of the cushion 21 as described above, and for example, has a ratio of expansion and contraction of 20% or more, in a direction on a face plane (length-width directions).

Examples of the skin 30 include a film made of a resin (an urethane elastomer, an olefin elastomer and the like), a cloth made of fibers having high elasticity, a metallic thin film, paper such as Japanese paper, a thin rubber sheet with grain finish or embossing finish for preventing the skin 30 from being reflected in the glasses (windshield and the like). Specifically, a textile made of Spandex (polyurethane synthetic fiber) may be used.

However, the skin 30 is not limited to a form of a thin film, and may have a specific thickness, obtained from a mixture of a colored olefin gel and deformable short fibers (soft fibers).

<<Effect of Door Trim>>

According to the door trim 1, the following effects can be chiefly obtained.

(1) Since the cushion 21 that covers a large portion of the door trim 1 is made of an olefin gel elastomer, a styrene gel elastomer or the like having JIS A hardness of 5 or less, or Asker C hardness of 20 or less, when the driver grasps or pushes the door trim 1, the cushion 21, i.e., the door trim 1 deforms in accordance with the grip force or pressure applied by the driver. Accordingly, the tactual feel of the door trim 1 is enhanced, adding quality to the vehicle interior.

(2) Since the cushion 21 made of a gel elastomer is enclosed by the base 10 and the skin 30, and not externally exposed, the gel elastomer generally having tackiness (tack property) never come into direct contact with the driver.

(3) Since the skin 30 has elasticity and adheres to the cushion 21, the skin 30 can deform in a uniformed manner with the cushion 21, while being brought into close contact with the cushion 21.

(4) Since the cushion 21 made of a gel elastomer has appropriate elasticity, when the grip force or the like by the driver are released, the door trim 1 resumes the original shape.

<<Production Method of Door Trim>>

Next, a method for producing the door trim 1 according to the present invention will be described with reference to FIG. 3.

Figure 3A:
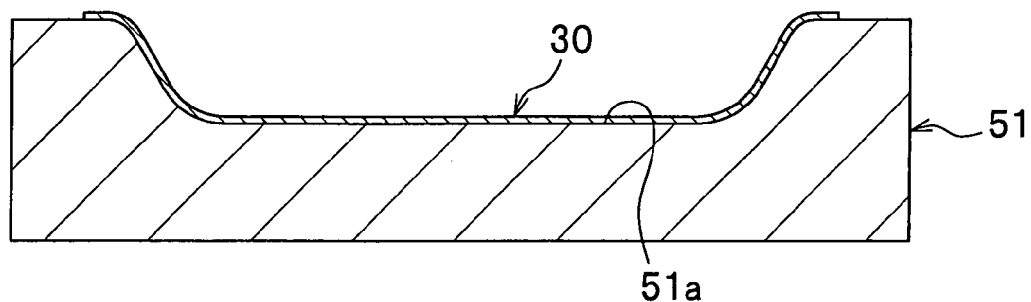
FIG. 3A shows a state in which a skin is placed in a mold.

As shown in FIG. 3A, the skin 30 is disposed along a recess face 51a of a lower mold 51 and temporarily attached thereto. The recess face 51a is formed in the lower mold 51 so as to have a shape corresponding to the shape of the skin 30 as a product that forms a side face of the vehicle interior of the door trim 1.

Figure 3B:
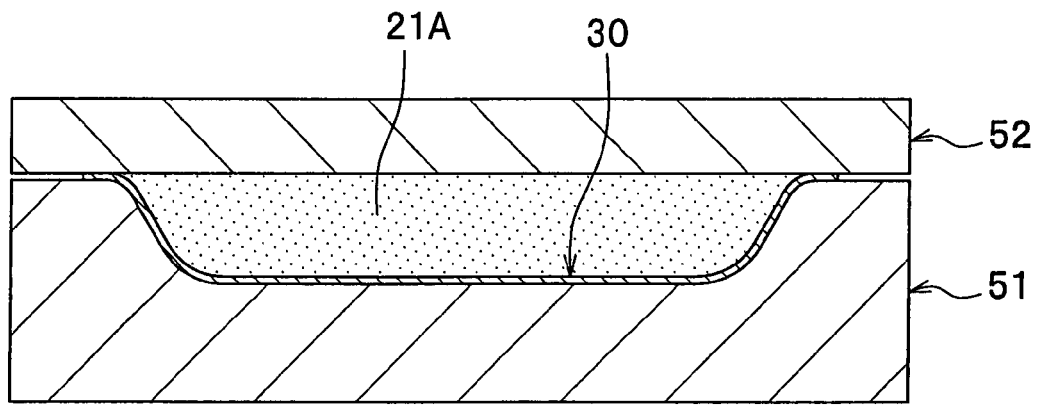
FIG. 3B shows a state in which a gel is injected for forming a cushion.

As shown in FIG. 3B, an upper mold 52 is placed over the lower mold 51 and the mold is closed. Onto the skin 30, a gel 21A which is to be a gel elastomer forming a cushion 21 is injected.

Hereinafter, the gel 21A and the injection of the gel 21A will be described in detail, in a case where the cushion 21 is made of a styrene gel elastomer.

A styrene gel elastomer is prepared by mixing 60-90 mass % of a paraffinic oil, 10-40 mass % of a styrene elastomer, and 5 mass % or less of a thermostable/weather proofing material. The resultant styrene gel elastomer, having JIS A hardness of 5 or less, is pelletized. This pelletization is for facilitating handling (measuring, transporting or the like) of the styrene gel elastomer.

Examples of the paraffinic oil include a process oil Diana (registered trademark) manufactured by Idemitsu Kosan. Examples of the styrene elastomer include Sumitomo TPE-SB manufactured by Sumitomo Chemical, and Kraton D and Kraton G manufactured by Kraton Polymers Japan. Examples of the thermostable/weather proofing material include Nonflex (registered trademark) and Swanox manufactured by Seiko Chemical.

The pellet is introduced to an appropriate hopper, and kneaded at a molding temperature of 100-200° C. (preferably 180-200° C.) to thereby prepare a molten gel 21A. The gel 21A is injected on the skin 30 attached to the lower mold 51, using an injection molding machine specialized for thermoplastic resin (e.g., single or double injection machine).

An injection pressure is adjusted approximately to 500-900 kg/cm$^2$, an injection time is set at approximately 3-10 seconds and a temperature of the lower mold 51 is set at 30° C. or less.

As a nozzle for injecting the gel 21A, a shutoff nozzle is preferable since an amount per shot can be appropriately adjusted (the shot can be appropriately dispensed). With the use of the shutoff nozzle, the gel 21A is excellently injected and the suitable cushion 21 can be obtained. Especially, in the case of the gel 21A containing a foaming agent for obtaining the foamed cushion 21, the gel 21A present in the nozzle in a state of foam is prevented from scattering from the nozzle, by closing the shutoff nozzle when injection is not performed.

It is preferred that the injection speed be made as fast as possible, since a faster speed for injecting the gel 21A prevents the outer face of the cushion 21 from being rough.

In addition, an injection pressure (dwelling) of the gel 21A and a pressure (back pressure) in the lower mold 51 upon injection are appropriately adjusted, so that the gel 21A around an inlet gate (not shown) is not forced into the lower mold 51, in order to prevent the formation of roughness on the outer face of the cushion 21, which may otherwise deteriorate the appearance. It should be noted that, since the viscosity of the molten gel 21A is low and the flowability thereof is high, a pressure increase in the mold (back pressure) is not required, in order to fill the minute space or corners formed in the lower mold 51 and the upper mold 52 with the gel 21A.

An increase in the molding temperature will rise a transparency of the gel 21A (cushion 21). However, it is preferable that the molding temperature be set at a specific value or lower at which a gas quenching of the cushion 21 does not occur (e.g., 240° C. or lower).

Subsequently, the injected gel 21A fills the space between the lower mold 51 and the upper mold 52, and the gel 21A is, for example, welded to the skin 30, and the cushion 21 and the skin 30 are excellently adhered to each other. Especially in a case where the skin 30 is a textile made of fiber, the injected gel 21A flows into the mesh of the textile, and thus the cushion 21 and the skin 30 are excellently and tightly adhered to each other.

Since the injected gel 21A and the skin are, for example, welded, there is no need to apply adhesives or the like to a face of the skin 30 to which the gel 21A is welded (upper face in FIG. 3) before the injection of the gel 21A. Accordingly, between the skin 30 and the cushion 21 in the door trim 1 as a product, an adhesive layer, which becomes generally hard, is not formed and thus the soft tactual feel of the door trim 1 is not deteriorated.

After the gel 21A is injected, it is cooled for a specific cool-down time (e.g., 25 seconds or more).

Figure 3C:
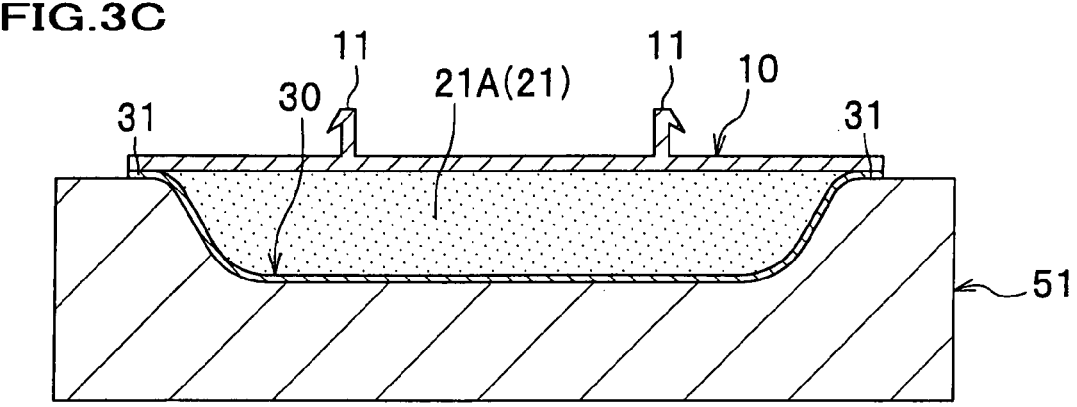
FIG. 3C is a state in which a base is welded.

Subsequently, the upper mold 52 is removed, and as shown in FIG. 3C, the base 10 is placed over the gel 21A. The base 10 is welded and adhered to the gel 21A and the edge portion 31 of the skin 30, by utilizing heat of the injection of the gel 21A, or by reheating these members. As a result, the door trim 1 shown in FIG. 2 can be obtained.

<<Effect of Production Method of Door Trim>>

According to the method for producing the door trim 1, the following effects can be obtained.

(1) Since the gel 21A which is to be the cushion 21 is injected onto the skin 30 disposed along the recess face 51a having a shape corresponding to the shape of the skin 30 as a product, the gel 21A and the skin 30 are excellently welded, the cushion 21 and the skin 30 are excellently adhered to each other, and thus the base 10, the cushion 21 and the skin 30 are unified as one body.

(2) Since the base 10 is placed over the injected gel 21A before the injected gel 21A is thoroughly cooled, the gel 21A and the base 10 are excellently welded, and the cushion 21 and the base 10 can be excellently adhered to each other.

(3) Unlike a conventional door trim 101 shown in FIG. 4 in which edge portions 131, 131 of a skin 130 are fixed to a stage 140 by tackers 132, 132 in order to cover a cushion 121, the present invention does not require such stage and tackers. In addition, unlike the conventional door trim 101 in which the stage 140 is engaged with a base 110 by clips 141, 141, the present invention does not require such stage engagement, and therefore the productivity of the door trim is increased.

The embodiments of the present invention have been described above. However, the present invention is not limited to the above embodiments, and it is a matter of course that the above embodiments may be properly modified, as in the following descriptions.

In the method for producing the door trim 1 according to the above-mentioned embodiment, as shown in FIG. 3, the upper mold 52 is disposed above the skin 30, and the gel 21A is injected into the space formed between the skin 30 and the upper mold 52. However, instead of the upper mold 52, the base 10 may be disposed, and then the gel 21A may be injected into the space formed between the skin 30 and the base 10. With this configuration, while injecting the gel 21A, the injected gel 21A and the base 10 can be welded by the heat of the injected gel 21A, to thereby omit reheating of the gel 21A and at the same time enhance the adhesiveness between the cushion 21 and the base 10.

Alternatively, the cushion 21 may be formed first using a mold having a shape corresponding to the shape of the cushion 21, and then the cushion 21 may be welded to the base 10 and the skin 30.

Furthermore, the door trim may be a door trim 2 shown in FIG. 5. The door trim 2 shown in FIG. 5 includes two cushions 22, 23 each made of a gel elastomer, aluminum flakes 24 (scatterers), and an LED (Light Emitting Diode) 40 (a light source) embedded in the base 10 disposed on the back side (opposite side to the vehicle interior side) of the door trim 2. The cushions 22, 23 are overlaid to form a two-layer structure. The aluminum flakes 24 are made of small aluminum pieces, which are dispersed in the cushion 22 on the vehicle interior side, for scattering light from the LED 40. In addition, the appearance of the door trim 2 is made metallic tone. Optionally, the aluminum flakes 24 may be dispersed in the skin 30 and the cushion 23.

The LED 40 is designed to work with ON/OFF of a vehicle light. In this door trim 2, the skin 30 is made transparent, the cushion 22 and the cushion 23 are made transparent or semi-transparent, and therefore all of them have light transmission property.

It should be noted that, as a light source, there may be used a light bulb, an EL (Electro Luminescence) panel and the like, instead of the LED 40.

According to this door trim 2, with a use of the LED 40, the cushions 22, 23 and the skin 30 are illuminated, and at the same time, light from the LED 40 is scattered by the aluminum flakes 24. As a result, the entire door trim 2 is made brighter, which creates a pseudo-state of illumination, which in turn increases an irradiation range R by the LED 40. Consequently, the driver can easily and visually recognize the position of the door trim 2, the position of the door handle (not shown) and the like, even during evening hours.

When the illuminating decorative part is used for decorating a shift lever knob, a hand brake lever (grip portion), a cup holder or the like, the driver can easily and visually recognize the shift lever knob and the like even during evening hours, which enhances the ease of operation. Optionally, the illuminating decorative part may be used as a safe foot light or courtesy door lamp. Furthermore, a timing and color of lighting of the LED 40 may be made to work with a driving state of the vehicle, a position of the gear shift lever and the like. For example, the LED 40 as a red light may blink when the gear is shifted into reverse.

Instead of, or in addition to, the aluminum flake 24, particles having a certain dimension with an appropriate color may be dispersed, to form a dot pattern in the door trim 2 for example, so as to enhance design. Alternatively, the cushion 22 itself or the like may be colored with pigments (color particles).

Figure 6A:
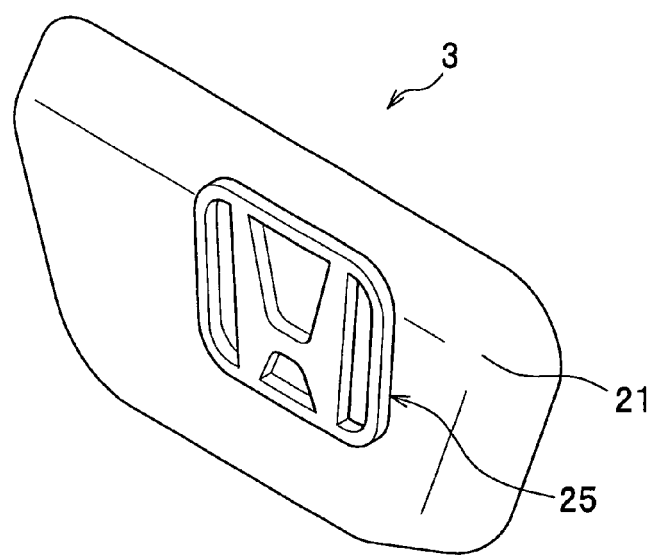
FIG. 6A is a perspective view.
Figure 6B:
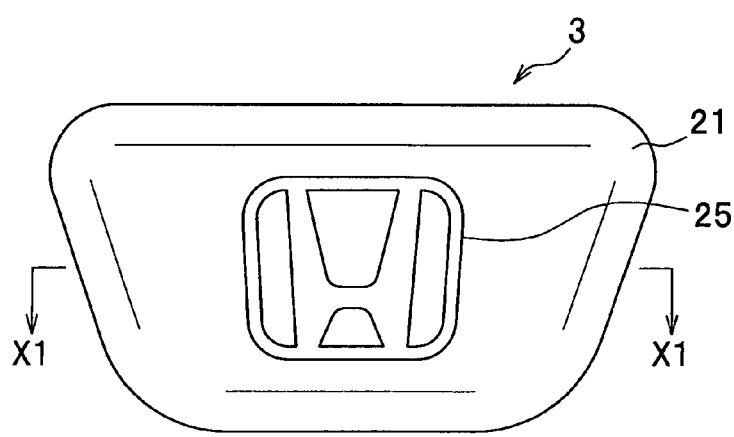
FIG. 6B is a front view.
Figure 6C:
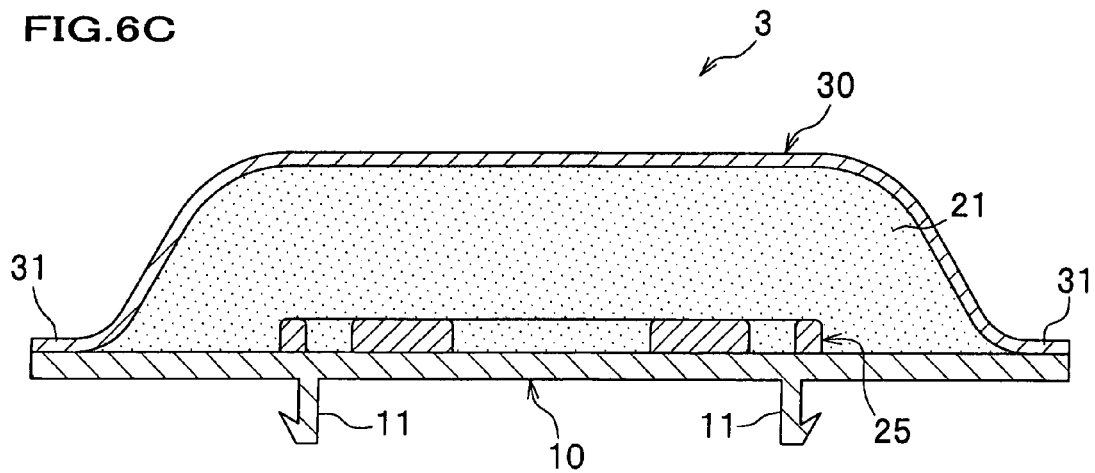
FIG. 6C is a cross sectional view taken along a line X1-X1 in FIG. 6B.

Moreover, as shown in FIG. 6A-6C, the decorative part may be a steering wheel emblem part 3 positioned at the center of a steeling wheel (not shown). As shown in FIG. 6A, the steering wheel emblem part 3 includes a cushion 21 and a cushion 25. Both the cushions 21, 25 are made of gel elastomers, but they have different optical reflectivities. Further, as shown in FIG. 6B, the cushion 25 forms a logo and positioned at the center of the steering wheel emblem part 3 when seen from the front. When the steering wheel emblem part 3 is seen from outside, as shown in FIG. 6A, the logo formed by the cushion 25 is presented visibly as a three-dimensional shape.

Furthermore, the decorative part is not limited to the door trims 1, 2 and the steering wheel emblem part 3, and may be a part for covering and decorating an instrument panel, a console (box), a roof lining, a pillar garnish, an arm rest, a shift lever knob, a hand brake lever (grip portion) and the like.

Though the embodiments above are described with reference to automobile, the decorative part can be applicable to other types of vehicle, such as boats, ships, trains and air planes.

What is claimed is:

1. A decorative part for decorating a vehicle interior, comprising
    a base; a cushion; and a skin with elasticity having a portion thereof being fixed to the base,
    the skin being adhered to the cushion and covering the cushion,
    the cushion being made of a gel elastomer having JIS A hardness of 5 or less or Asker C hardness of 20 or less, and
    the skin and the cushion having a light transmission property.

2. The decorative part according to claim 1, wherein the gel elastomer is any one of an olefin gel elastomer and a styrene gel elastomer, and the base is made of an olefin elastomer, 3. The decorative part according to claim 1, further comprising a light source for illuminating the cushion and the skin.

4. The decorative part according to claim 1, further comprising color particles dispersed in at least one of the cushion and the skin.

5. The decorative part according to claim 1, further comprising scatterers for scattering light dispersed in at least one of the cushion and the skin.

6. The decorative part according to claim 1, wherein the cushion is welded to the top surface of the base.

7. The decorative part according to claim 5, wherein the cushion comprises a first cushion and a second cushion and wherein the scatterers are disposed in at least one of the second cushion and the skin.

8. The decorative part according to claim 3, wherein the light source is embedded in the base.

9. The decorative part according to claim 5, wherein the scatterers disperse the light at an obtuse angle.

10. The decorative part according to claim 5, wherein the scatterers are aluminum flakes, 11. The decorative part according to claim 1, wherein the skin is transparent and the cushion is transparent or semi-transparent.

* * * * *